United States Patent [19]
Nenyei et al.

[11] Patent Number: 5,628,564
[45] Date of Patent: May 13, 1997

[54] METHOD AND APPARATUS FOR WAVEVECTOR SELECTIVE PYROMETRY IN RAPID THERMAL PROCESSING SYSTEMS

[75] Inventors: Zsolt Nenyei, Blaustein; Andreas Tillmann, Neu Ulm Pfuhl; Heinrich Walk, Allmendingen, all of Germany

[73] Assignee: AST Elekronik GmbH, Kirchheim, Germany

[21] Appl. No.: 412,278

[22] Filed: Mar. 28, 1995

[30] Foreign Application Priority Data

Apr. 26, 1994 [DE] Germany ............ 44 14 391.5

[51] Int. Cl.⁶ .................................................. G01J 5/08
[52] U.S. Cl. ........................................ 374/121; 374/126
[58] Field of Search .................... 374/121, 123, 374/126, 130, 161; 250/338.1, 341.1, 341.8; 356/43

[56] References Cited

U.S. PATENT DOCUMENTS

| | | | |
|---|---|---|---|
| 4,890,245 | 12/1989 | Yomoto et al. | 374/121 |
| 4,919,542 | 4/1990 | Nulman et al. | 374/126 |
| 4,956,538 | 9/1990 | Moslehi | 374/126 |
| 4,989,991 | 2/1991 | Pecot et al. | 374/133 |
| 5,114,242 | 5/1992 | Gat et al. | 374/126 |
| 5,188,458 | 2/1993 | Thompson et al. | 374/121 |
| 5,226,732 | 7/1993 | Nakos et al. | 374/133 |
| 5,305,416 | 4/1994 | Fiory | 374/126 |
| 5,308,161 | 5/1994 | Stein | 374/126 |
| 5,388,909 | 2/1995 | Johnston et al. | 374/161 |
| 5,436,172 | 7/1995 | Moslehi | 374/128 |

FOREIGN PATENT DOCUMENTS

| | | |
|---|---|---|
| WO90/12295 | 10/1990 | WIPO . |
| WO92/12405 | 7/1992 | WIPO . |
| WO94/00744 | 1/1994 | WIPO . |

OTHER PUBLICATIONS

K. L. Knutson et al., Modeling of 3-dimensional effects on temperature uniformity in RTP of 8" wafers., IEEE Trans. On Semiconductor Manufacturing 7, 68, (1994).

*Primary Examiner*—G. Bradley Bennett
*Attorney, Agent, or Firm*—R. T. Hodgson

[57] ABSTRACT

A method and apparatus for optical pyrometry in a Rapid Thermal Processing (RTP) System, whereby the radiation used to heat the object to be processed in the RTP system is in part specularly reflected from specularly reflecting surfaces and is incident on the object with a particular angular distribution, and the thermal radiation from the object is measured at an angles different from the angle where the incident radiation specularly reflected from the surface of the object is a maximum.

21 Claims, 4 Drawing Sheets

R= 0.98

R= 0.88

R= 0.5

METHOD AND APPARATUS FOR WAVEVECTOR SELECTIVE PYROMETRY IN RAPID THERMAL PROCESSING SYSTEMS

BACKGROUND OF THE INVENTION

1. Field of the Invention

The present invention relates to an apparatus and a method for measuring the temperature of an object heated in a Rapid Thermal Processing (RTP) system. More specifically, the present invention discloses a method and apparatus for measuring the temperature of an object if interference effects disturb the conventional pyrometric methods of temperature measurements. The present invention is particularly useful in the case of semiconductor wafers which have layers of material deposited on the back side of the wafer, and in the case of Rapid Thermal Chemical Vapor Deposition (RT-CVD). The starting point of the present invention is that stray light from the heating lamps entering the measurement pyrometer aperture raises the background signal and lowers the measurement accuracy of the conventional pyrometers, and the present invention shows a new method and an apparatus for reducing the stray light.

2. Description of the Prior Art

The field of rapid thermal processing has been chiefly concerned with uniformly heating semiconductor wafers to a known temperature, and measuring and controlling the temperature time profile of the wafer for the various annealing, chemical reaction, and film growth techniques required by the various processes. To achieve uniformity of heating, the individual lamps of the heating systems have been separately controlled by the control system, and the reflector systems have been carefully designed to irradiate the wafer in a known pattern. To this end, the reflector systems have made use of diffuse reflectors to homogenize the light intensity incident on the wafer, as outlined in "Modeling of Three-Dimensional Effects in Rapid Thermal Processing of Eight Inch Wafers", K. L. Knutson, S. A. Campbell, and F Dunn, IEEE Transactions on Semiconductor Manufacturing, 7, (1994) p. 68–71.

The pyrometric measurement of wafer temperature in RTP systems is known to be complicated because the relatively weak thermal emission from the wafer must be filtered out from the relatively much stronger background radiation from the much hotter heating lamps. The pyrometer generally measures radiation at a wavelength where the radiation from the lamps reaching the wafer surface is minimal. The accuracy of the measurement is fundamentally determined by the selectivity of the filter used to determine the wavelength. The background radiation from the RTP system lamps can come either from reflection of the radiation from the wafer, or from transmission of radiation through the wafer.

Optical pyrometric temperature measurements in RTP systems require the selection of a wavelength and an optical bandwidth of the measurement. This choice is made on the basis of the material parameters of the wafer, the reactor chamber, the reflectors, and the radiation sources. (See for example U.S. Pat. No. 5,188,458 and DE 4012615C2)

The so called "Ripple Technique" (U.S. Pat. No. 5,154,512) is a special case of optical pyrometric measuring. The lamp power supply is modulated with a frequency of 5–120 Hz, and the emission from the wafer is measured with a first optical fiber while the emission from the lamps is measured with a second optical fiber. The wafer temperature usually cannot change fast enough to follow the modulation frequency, while the lamps in general can. The variation in lamp radiation is measured with the second optical fiber, and the variation of the radiation measured with the first fiber can be used to determine the radiation reflected from the wafer. Once the reflection coefficient for the wafer is known for a particular wavelength, the emissivity of the wafer at that wavelength is known, and the unvarying part of the radiation collected by the first optical fiber due to the emission from the wafer can be used to calculate the temperature. This technique is, however, very sensitive to temperature and the arrangements for the necessary mechanical adjustments of the light fibers are very expensive.

Use of optical fibers and light pipes to collect the light does not change the principles of the measurements cited above.

The best signal to background ratios that can be reached using monochromatic or narrow bandwidth pyrometric techniques is about 1000:1 (DE4012615C2), which allows good reproducibility of the temperature measurement. However, such monochromatic or narrow bandwidth pyrometric measurement can be very strongly influenced by layers of material of different indices of refraction on the surface of the object being measured, and the method is practically unusable if the measured wafer surface has optically thin layers of variable layer thickness deposited thereon. The reflection coefficient at any wavelength, and hence the emissivity (which is 1 minus the reflectivity) of the surface, varies enormously as the various layer thicknesses vary. For example, as one layer of silicon dioxide grows from 0.25 micron thickness to 0.5 micron thickness on a silicon wafer, the reflectivity for 1.5 micron light varies from a minimum of 6% to a maximum of 42%. In such cases, a pyrometer can only be used if the bandwidth of the measured radiation is broad enough that the constructive and destructive interferences within the measuring bandwidth compensate each other. In the case cited above, a wavelength of 3 micron would have a minimum in reflectivity as the thickness of the oxide varied when the 1.5 micron light has a reflectivity maximum. A measurement band of from 1.5 to 3 microns, (or a wavelength of 2.25±0.75 microns) would be preferable to compensate the variations in emissivity. In such a case, it can be shown (on conservation of energy grounds) that the broadband wavelength filter cannot filter out the radiation from the background, and the signal to background ratio becomes very small.

We have recognized that, under specially determined conditions, it is possible to effectively separate the photons thermally emitted from the wafer from the photons from the heating lamps which have been reflected from and transmitted through the wafer by using the wave vector or the angle which the photons leave the surface. Using a statistical ray tracing procedure, we have calculated the angular distribution of lamp radiation reflected from the surface of a specularly reflecting wafer in the cases of an ideal rectangular reflector chamber and a cylindrical reflector chamber with specularly reflecting surfaces, and have found that, under special conditions, relatively little lamp radiation reflected from the surface is normal to the surface. The thermal radiation, however, obeys Lambert's law, and is mostly normal to the surface. The two types of radiation can thus be separated by controlling the acceptance angle of the pyrometer.

SUMMARY OF THE INVENTION

In accordance with this invention, the reflector chamber of an RTP system is carefully designed with very highly polished, specularly reflecting surfaces to minimize (in a particular range of angles) the light from the radiation sources in the RTP system that is incident on a particular, specularly reflecting, area of on the surface of an object to be processed, and to minimize (in a particular range of angles) the radiation from the radiation sources transmitted through the object. The acceptance angle and position of the optical temperature measurement system is then restricted to a particular range of angles correspondingly so as to maximize the ratio of the measured radiation emitted from the object to the radiation reflected from the reflector and transmitted through the object in a broad wavelength band.

DETAILED DESCRIPTION OF THE INVENTION

Figure 1:
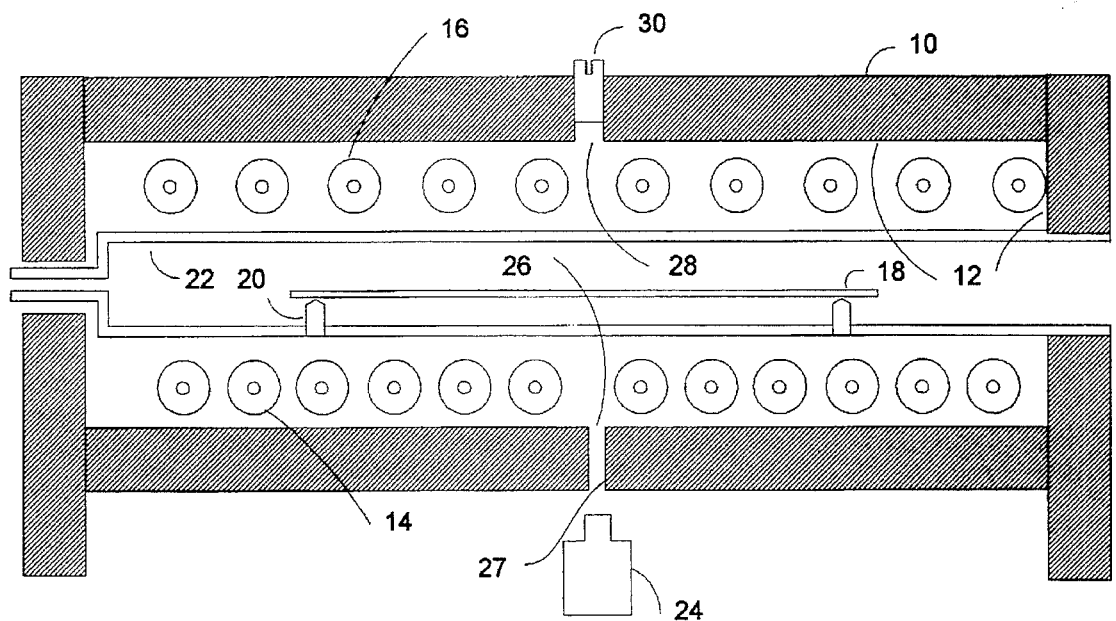
FIG. 1 shows a sketch of the side view of an RTP system having a rectangular reflection chamber.

FIG. 1 shows a sketch of the improved reflection chamber 10 which has highly reflecting and finely polished specular reflecting inner surfaces 12. The chamber 10 can be made, for example, of brass which is then gold plated. Tungsten-halogen linear lamps are arrayed in two banks, the lower bank denoted 14 and the upper bank denoted 16. The semiconductor wafer 18 to be measured is supported so that it is exactly level by quartz pins 20. It is very important that the wafer be exactly parallel with the top and bottom reflecting walls of the reflector chamber 10. To this end, the quartz pins 20 can be chosen to have the correct length. RTP takes place in the quartz reaction chamber 22. The pyrometer 24 measures the wafer emission which is emitted in a small range of angles about the normal to the wafer surface through the hole 26 which has blackened and radiation absorbing sidewalls 27. Thermally emitted radiation from the wafer which might normally be reflected from the reflector on the opposite side of the reflection chamber and pass back through the wafer may be absorbed by a blackened hole 28. A screw 30 is shown blocking this hole, but another pyrometer measuring a different wavelength than pyrometer 24 could be used to good advantage measuring using the hole 28 as an observation port. The screw 30 can have an absorbing end, or it could have a shaped end and be highly reflecting. It is important that the reflecting surfaces 12 have very little scatter, so that most of the light from the lamps 14 and 16 is specularly reflected from the reflecting surfaces 12 with an angle of incidence equal to angle of reflection. It is preferable that light in the wavelength band measured by the pyrometer have less than 10% scatter, even more preferable that the light have less than 5% scatter, and most preferable that the scattered, non specularly reflected light is less than 1% of the total reflected light It is also important that the top and bottom surfaces of the chamber be accurately parallel, and parallel with the wafer surface, and that the reflecting ends and sides of the chamber are accurately perpendicular to the top and bottom surfaces of the chamber and to each other. In this case, a light ray which starts at any lamp and travels perpendicular to the walls cannot enter the hole 26. The lamps are carefully placed so that the pyrometer cannot "see" them, nor can the pyrometer "see" radiation from the lamps unless it has had more than a defined number of specular reflections from the wafer 18. At a minimum, the defined number of specular reflections from the wafer suffered by radiation "seen" by the pyrometer should greater than 1. More preferably, the defined number should be greater than 2, and most preferably, the defined number should be greater than 3. The only radiation that can enter the hole 26 and pass through without being absorbed in the blackened side walls 27 is radiation thermally emitted from the wafer 18, the radiation which has made more than the defined number of specular reflections from wafer 18 and an equal number, or one fewer, reflections from the specularly reflecting surface 12, and light which has been diffusely scattered.

Figure 2:
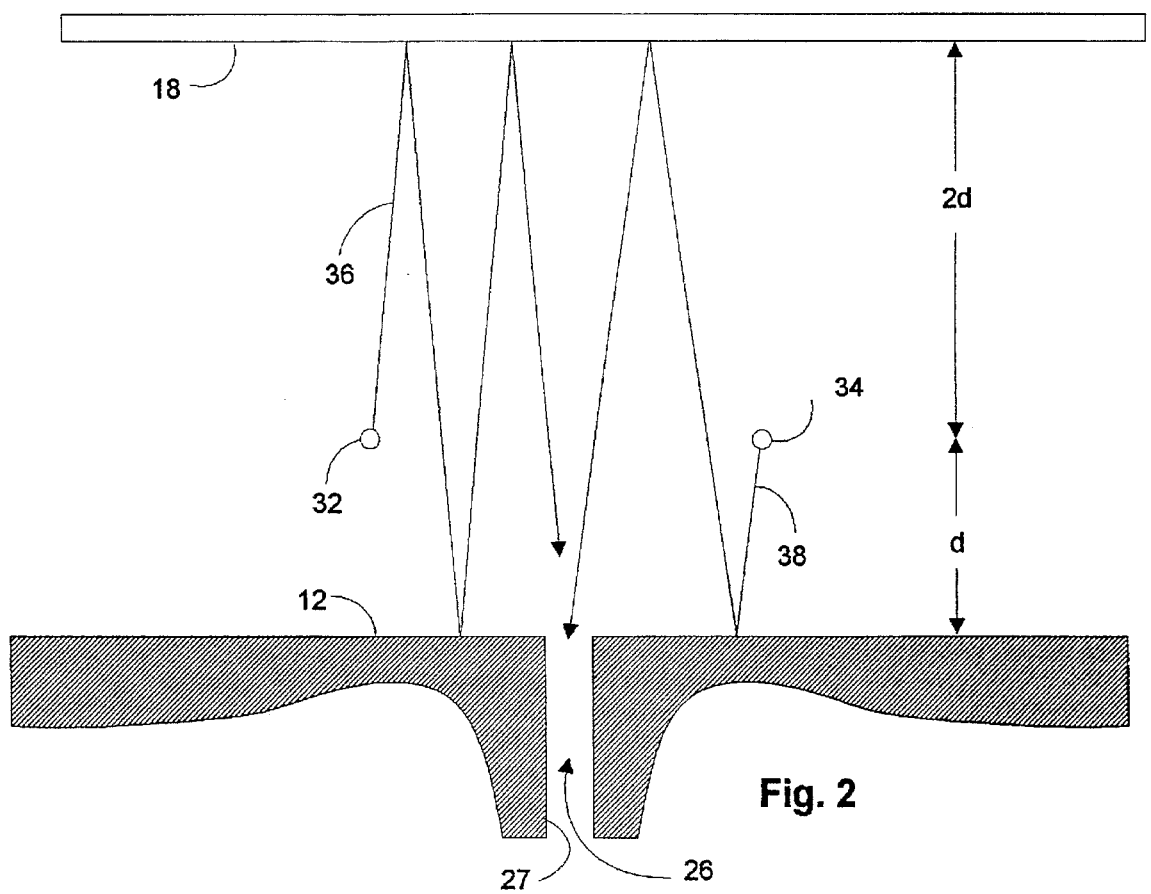
FIG. 2 shows a sketch of light rays emitted from lamp filaments reflecting from the reflecting surfaces of FIG. 1.

For purposes of illustration, ray tracings of light from lamp filaments 32 and 34 spaced a distance 2d from the wafer 18 and d from the specularly reflecting reflector 12 are shown in FIG. 2. A light ray 36 having two specular reflections from the wafer 18 and one specular reflection from the reflector 12 is shown emanating from one lamp filament 32, while another ray 38 emanating from lamp 34 and having one reflection from the wafer 18 and one reflection from the reflector 12 is shown impinging to the axis of the aperture 26 to the pyrometer. The ray 38 will impinge on the sidewall and be absorbed. The ray 36 is closer to perpendicular to the wafer, and hence has a greater chance than light my 38 of passing through the aperture 26 without hitting the sidewall 27 and being absorbed. The more "bounces" the light my makes off the wafer as it travels between the lamp 32 and the aperture 26, the closer to perpendicular is the angle of the light ray bouncing off the wafer surface, and the greater chance the light ray has to make it through the aperture to the pyrometer. Clearly, reducing the area of the aperture and the acceptance angle of the aperture 26 with the blackened side walls 27 raises the number of "bounces" that the lamp radiation must make before it can be "seen" by the pyrometer. Since a semiconductor wafer typically absorbs 70% of the incident radiation, each reflection from the wafer reduces the radiation which will be seen as background by the pyrometer. In the particular case of linear lamps shown by FIG. 1, the aperture 26 may be a slot elongated in the direction of the linear lamps to increase the area of the wafer measured and to increase, in one direction, the angles accepted by the pyrometer.

Figure 3A:
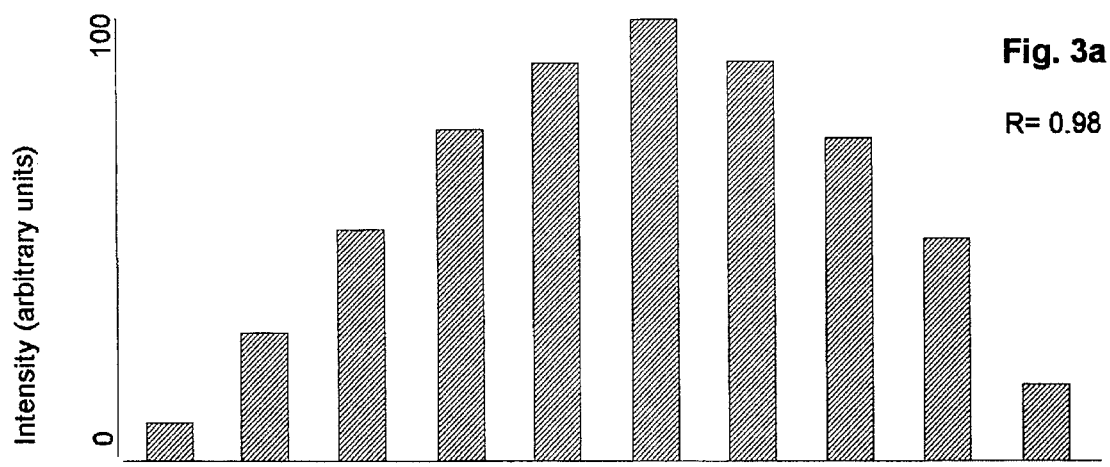
FIG. 3a shows the results of a statistical calculation of the number of photons of the light from a battery of lamps shown in FIG. 1 having angles of incidence α incident on a wafer in an RTP system having a rectangular, specularly reflecting chamber with reflecting walls having a reflection coefficient of 0.98.
Figure 3B:
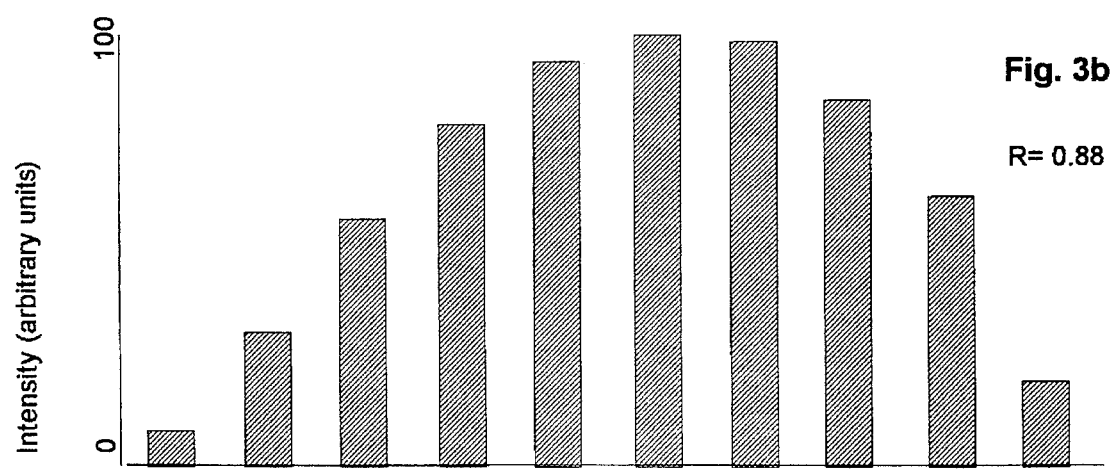
FIGS. 3b and 3c show the results of the calculations for reflection coefficients 0.88 and 0.5 respectively.
Figure 3C:
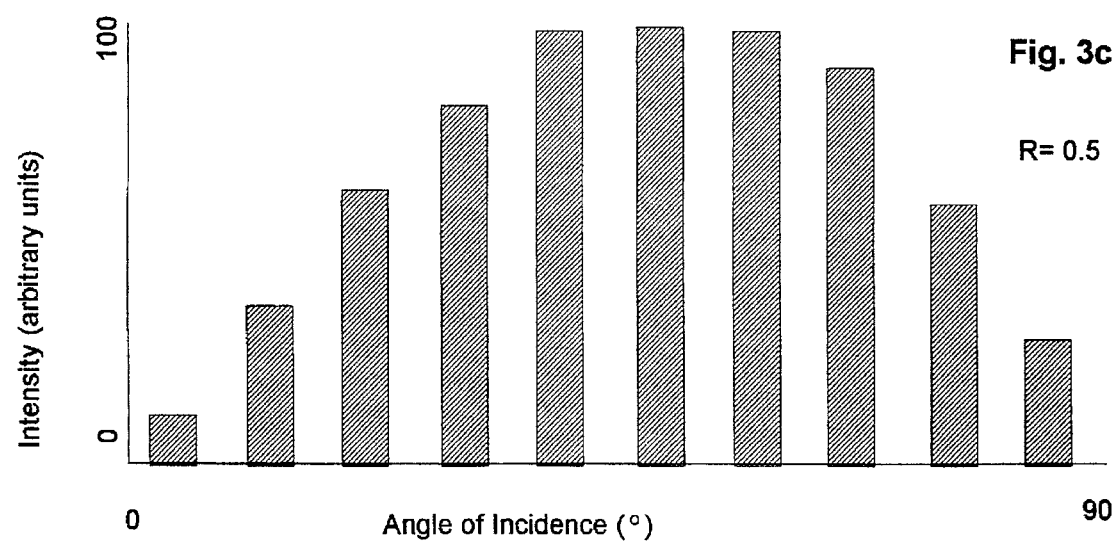

A statistical study of the light rays incident on a wafer opposite the pyrometer in a system like that shown in FIG. 1 was carried out for an RTP system with 27 lamps and a 150 mm semiconductor wafer. The wafer was highly polished. The results for a chamber specular reflectivity of 0.98, 0.88, and 0.5 are given in FIG. 3a, 3b and 3c respectively. Note the results depend very little on the absolute value of the chamber specular reflectivity, and that in all cases, very little light is incident on the wafer from a direction perpendicular or parallel to the wafer surface. Since the reflected light has the same angle of reflection from the polished wafer as the angle of incidence, little light is reflected in the perpendicular direction and little reflected light thus enters the pyrometer.

In fact, the reflecting surfaces of the reflection chamber must only be highly polished in the immediate area surrounding the hole 26 and opposite the hole 26. Light scattered in a non specular way from a further distance must make too many bounces to make much difference in the statistics.

The results calculated using a cylindrical reflecting chamber are quite similar to the results found using the rectangular chamber. In fact, with proper choice of a reflection chamber, it should be possible to arrange the distribution of incident light angles on the wafer in the region "seen" by the pyrometer so that a pyrometer viewing angle remains free of specularly reflected light. For example, a point source lamp with an parabolic reflector could be arranged so that substantially all the light falling on the surface would fall near one angle only and all the reflected light would exit at one angle, leaving all other angles free for pyrometer observation. In the same way, a single linear lamp with a linear parabolic reflector would leave many angles free, as would, for example, two linear lamps with two parabolic reflectors symmetrically arranged about the normal to the wafer surface.

The heated wafer emits radiation according to Lambert's law, which is a cosine squared distribution with the radiation pattern peaked in the direction perpendicular to the surface. Since there is little light reflected from the wafer in the perpendicular direction in the examples quoted, the pyrometer readings are not greatly influenced by the background radiation from the lamps.

A strongly scattering surface of the wafer, of course, will introduce errors into the measurement. The number of wafers used in manufacturing, however, which have highly polished or finely etched backside surfaces is growing year by year. The front side of wafers is always highly polished to start. The edge of the wafer remains highly polished throughout the manufacturing process Microstructures on the front side are more or less always scattering, but test structures constructed on the front side are often much more homogeneous. These sites can be used as the "viewing area" for the pyrometer.

The angle of acceptance of the pyrometer can be preferably narrowed with a cylindrical or conical absorber, which may be replaceable to allow different measurement angles and different areas to be used in different applications, placed between the pyrometer and the wafer surface. The conical absorber can be made preferably from graphite covered with SiC so that the conical absorber absorbs all photons which do not come substantially perpendicularly from the substrate.

The problems of measuring semiconductor wafers at low temperature are well known. Lightly doped silicon wafers with thicknesses from 0.5 to 0.8 mm transmit a high percentage of the radiation of wavelengths longer than 1.1 microns at temperatures less than 600C., and gallium arsenide wafers transmit even to 800 or 900C. The radiation incident on the wafer and transmitted through the wafer must clearly be accounted for in the design of the reflector chamber and pyrometer viewing ports. A hole in the reflector opposite the pyrometer can trap radiation and cut down the radiation emitted from the wafer which would be reflected perpendicularly from the opposite wall, back perpendicularly through the wafer, and to the pyrometer. The diameter of the hole must be determined by considering the acceptance angle of the pyrometer and the height of the reflection chamber, so that the pyrometer does not "see" any part of the reflection chamber.

The hole in the reflector wall opposite the pyrometer can be used as a view port for a second pyrometer. The second pyrometer is preferably sensitive to a different spectral region or has a different bandwidth or both. For the low temperature measurements where the wafers are semitransparent to the radiation which the first pyrometer measures, the second pyrometer preferably measures a wavelength region where the wafer is opaque.

The signals from both the pyrometers can be used, either by themselves or simultaneously, to measure the wafer temperature. Which wavelength and bandwidth each pyrometer uses are determined by the wafer characteristics and the temperature range. Instead of a second pyrometer, the second hole can be closed off with a screw which has a blackened end to absorb all the light which might be transmitted through a partially transparent wafer. For wafers which absorb all the lamplight and the radiation measured by the pyrometer, the end of the screw can be gold plated and the position of the screw can be adjusted to optimize the uniformity of heating of the wafer.

The usual calibration is necessary to practice the method of the present invention. The use of a broad band pyrometer, however, is advantageous in that the interference effects are automatically compensated and that the integrated signal from wave vector selected pyrometer "seeing" radiation emitted in a small range of angles may be greater than the signal would be from the usual narrow band pyrometer. The wave vector selective pyrometry of the present invention can also be used with the previously known "ripple-technique." The broad band detection in this case is naturally advantageous.

The effective bandwidth can be broadened by using two or more narrower bandwidth pyrometers or other optical sensors, each having a maximum sensitivity at a different wavelength. Thermal emission traversing the hole 26 can be split with a dichroic mirror, for example, and radiation of one wavelength can be sent to one detector, while the light in another wavelength band can be sent to a second detector. In this way, no measurement light is lost, and, as the reflectivity and emissivity of the wafer changes with changing layer thickness, it is possible for the emissivity at one wavelength to be near maximum while the emissivity at the other wavelength nears a minimum.

The lamp radiation may be reflected several times before it is diffusely scattered into the pyrometer. In this case, it will in general be partially polarized. An adjustable polarizing filter over the pyrometer can then be used to increase the signal to background ratio.

If the diffuse or scattered radiation from the measured wafer surface is so great that the measurements are disturbed, the scattered radiation can be calibrated by ramping the lamp temperature much faster than the thermal mass of the wafer can follow. In one or two seconds, the lamps can be ramped to the maximum intensity. Since the wafer in that time does not get hot enough to emit very much thermal radiation to the pyrometer, only the light scattered will be measured by the pyrometer as a function of lamp intensity. The measured scattered light signal can then be subtracted from the total pyrometer signal measured during RTP to calculate the signal due to the wafer emission alone.

Figure 4:
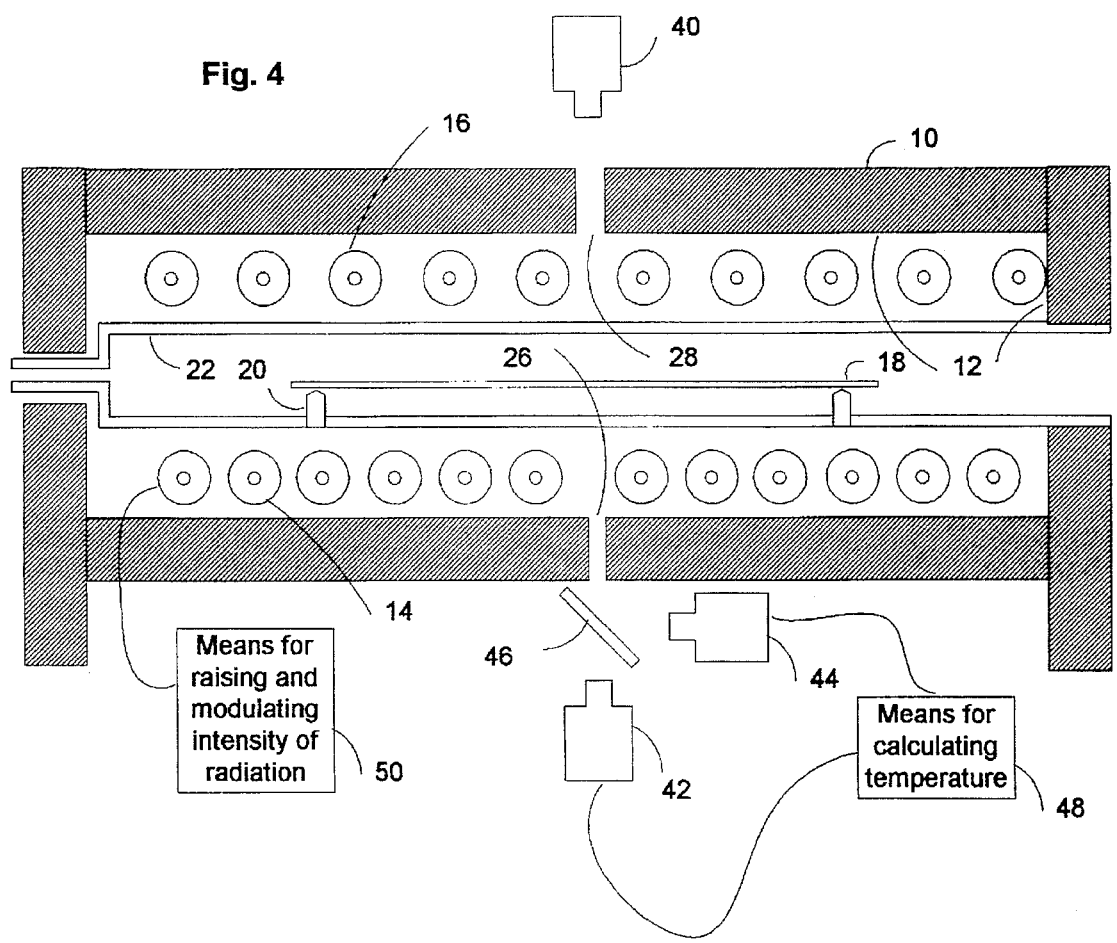
FIG. 4 shows a sketch of an alternative embodiment of the invention.

FIG. 4 shows a sketch of an alternative embodiment of the invention. A pyrometer 40 is shown replacing screw 30, and a dichroic mirror 46 directs radiation emitted from wafer 18 to either pyrometer 42 or pyrometer 44 depending on the wavelength of the radiation. A means 48 for calculating the temperature of the wafer 18 is shown connected to the pyrometers 42 and 44, and a means 50 for raising and modulating the intensity of radiation incident on the wafer 18 is shown connected to the banks 14 and 16 of lamps.

Figure 5A:
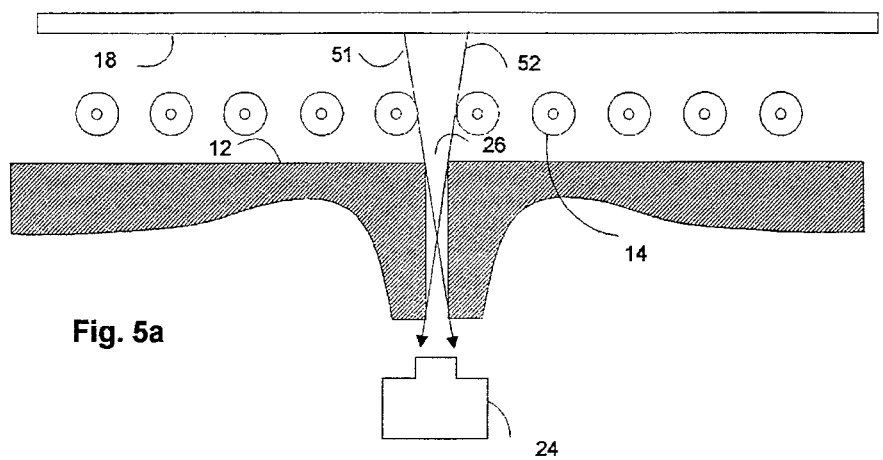
FIG. 5a and 5b show cutaway views in orthogonal directions of an elongated aperture for measuring the radiation from an object.
Figure 5B:
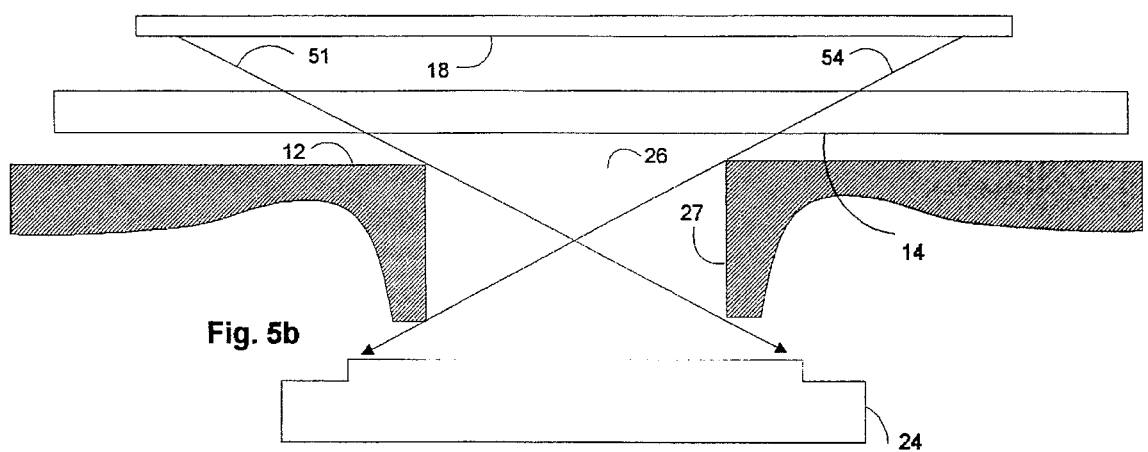

FIG. 5a shows a cut away view of part of the chamber 10 viewed along the direction of the linear heating lamps 14. The light rays 51 and 52 show the small angle of acceptance $\theta_1$ of the pyrometer 24 in the direction perpendicular to the lamps 14. FIG. 5b shows a cut away view of the chamber viewed along the direction perpendicular to the linear heating lamps 14 for an aperture 26 which is elongated in the direction of the lamps 14. The light rays 53 and 54 show the large angle of acceptance $\theta_2$ of the pyrometer 24 in the direction parallel to the lamps 14.

In comparison to the usual narrow bandwidth or intensity modulated pyrometry techniques, the wave vector selective pyrometry of the present invention uses a much broader bandwidth of the emitted radiation. The angular distribution of the lamp heating radiation is controlled by designing the reflection chamber, and the temperature measurement is done on radiation with a direction where the angular distribution of light reflected from the wafer has a minimum. Interference effects are minimal in the method of the present invention.

We claim:

1. A method for optical temperature measurement of an object to be processed in a rapid thermal processing system comprising: a. irradiating a specularly reflecting area of a surface of the object with incident radiation having a particular angular distribution, the incident radiation arising in part from one or more reflections of radiation from at least one radiation source, the reflections of radiation being substantially specular; and b. measuring radiation emitted and reflected from the specularly reflecting area of the surface of the object at angles different from an angle where the incident radiation reflected from the specularly reflecting area of the surface of the object has maximum intensity.

2. The method of claim 1 wherein the radiation emitted from the specularly reflecting area of the surface is measured with a measuring instrument sensitive to a broad bandwidth of the emitted radiation.

3. The method of claim 2 wherein the radiation emitted from the specularly reflecting area of the surface is measured with a measuring instrument sensitive to a center wavelength $\lambda_0$ and a bandwidth greater than or equal to $\pm\lambda_0/3$ about the center wavelength.

4. The method of claim 2 wherein the radiation emitted from the specularly reflecting area of the surface is measured by a plurality of optical sensors.

5. The method of claim 2, wherein the reflections of radiation have less than 10% of the reflected radiation scattered in a non-specular direction.

6. The method of claim 2, wherein the radiation reflected by the specularly reflecting area of the surface of the object and measured has been reflected more than once from the specularly reflecting area of the surface of the object.

7. The method of claim 1, wherein the object to be processed is a semiconductor wafer having a first surface and a second surface parallel to the first surface, wherein radiation emitted from the first surface at angles which are nearly normal to the surfaces is measured, and wherein radiation emitted from the second surface which is reflected back and transmitted through the wafer is measured, the radiation which is reflected back and transmitted through the wafer and measured is reflected from a surface of reduced reflectivity.

8. The method of claim 1, wherein the step of measuring the radiation emitted from the specularly reflecting area of the surface includes the step of measuring polarized radiation from the specularly reflecting area of the surface.

9. The method of claim 1, further comprising: c. rapidly raising the incident radiation intensity in a time short compared with the thermal relaxation time of the object to be processed; and d. calibrating the measurement system to account for incident light scattered to the measurement system.

10. The method of claim 1, wherein the step of irradiating the specularly reflecting area of the surface of the object includes modulating the irradiation power.

11. The method of claim 5, wherein the reflections of radiation have less than 5% of the reflected radiation scattered in a non-specular scattering direction.

12. The method of claim 11, wherein the reflections of radiation have less than 1% of the reflected radiation scattered in a non-specular scattering direction.

13. The method of claim 2, wherein the measurement instrument has an acceptance angle in a first direction substantially different from an acceptance angle in a second direction.

14. A rapid thermal processing apparatus for processing an object and optical temperature measurement of the object comprising; a reflection chamber for multiply specularly reflecting radiation from one or more radiation sources so that the radiation is incident on to a specularly reflecting area of the surface of the object to be processed, the radiation incident on the specularly reflecting area of the surface of the object having a particular angular distribution; and means for measuring radiation emitted from the specularly reflecting area of the surface of the object to processed, the means for measuring radiation being sensitive primarily to radiation emitted from the specularly reflecting area of the surface at an angle different from an angle where the radiation incident on the specularly reflecting area of the surface and then reflected from the specularly reflecting area of the surface has maximum intensity.

15. The apparatus of claim 14, wherein the means for measuring the radiation emitted from the specularly reflecting area of the surface is sensitive to a broad bandwidth of the emitted radiation.

16. The apparatus of claim 15, wherein the means for measuring the radiation emitted from the specularly reflecting area of the surface includes a plurality of radiation detectors.

17. The apparatus of claim 16, wherein at least two of the plurality of radiation detectors are sensitive to different radiation wavelengths.

18. The apparatus of claim 14, wherein the means for measurement of the radiation emitted from the specularly reflecting area of the surface is sensitive to the polarization of the radiation.

19. The apparatus of claim 15, further comprising: means for rapidly raising intensity of the radiation incident on to the specularly reflecting area of the surface of the object to be processed in a time short compared to the thermal relaxation time of the object to be measured; and means for calculating the corrected temperature using measurements of the radiation incident on to the specularly reflecting area of the surface of the object to be measured which is scattered to the measurement system.

20. The apparatus of claim 15, further comprising: means for modulating the intensity of the radiation incident on to the specularly reflecting area of the surface of the object to be measured.

21. The apparatus of claim 20, further comprising: means for calculating the corrected temperature using measurements of the modulated radiation incident on to the specularly reflecting area of the surface of the object to be measured which is scattered to the measurement system.

* * * * *